US012657127B2

(12) United States Patent
Jeong et al.

(10) Patent No.: US 12,657,127 B2
(45) Date of Patent: Jun. 16, 2026

(54) STORAGE DEVICE FOR STORING AUTONOMOUS DRIVING ANALYSIS DATA AND OPERATING METHOD OF THE SAME

(71) Applicant: Samsung Electronics Co., Ltd.,
Suwon-si (KR)

(72) Inventors: Yongtaek Jeong, Suwon-si (KR);
Jinwook Lee, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 0 days.

(21) Appl. No.: 18/905,484

(22) Filed: Oct. 3, 2024

(65) Prior Publication Data

US 2025/0245148 A1     Jul. 31, 2025

(30) Foreign Application Priority Data

Jan. 26, 2024     (KR) ........................ 10-2024-0012666

(51) Int. Cl.
*G06F 12/02*          (2006.01)
(52) U.S. Cl.
CPC .. *G06F 12/0246* (2013.01); *G06F 2212/1044* (2013.01); *G06F 2212/173* (2013.01)
(58) Field of Classification Search
CPC ......... G06F 12/0246; G06F 2212/1044; G06F 2212/173; G06F 3/0652; G06F 2212/7205; B60W 50/00; B60W 2050/0005
See application file for complete search history.

(56) References Cited

U.S. PATENT DOCUMENTS

| | | | |
|---|---|---|---|
| 9,753,779 B2 | 9/2017 | Maruyama | |
| 10,846,955 B2 | 11/2020 | Golov | |
| 11,544,408 B2 | 1/2023 | Lim et al. | |
| 11,609,850 B2 | 3/2023 | Liang | |
| 11,775,283 B2 | 10/2023 | Duval | |
| 2017/0153843 A1* | 6/2017 | Dewitt | ................. G06F 3/0605 |
| 2021/0072921 A1* | 3/2021 | Bielby | ................. G06F 3/0616 |
| 2022/0207930 A1 | 6/2022 | Kim et al. | |
| 2023/0221986 A1* | 7/2023 | O'Connell | .............. G06F 9/466 |
| | | | 711/154 |
| 2023/0315429 A1 | 10/2023 | Shiohara et al. | |
| 2024/0119765 A1* | 4/2024 | Hayashi | ................. G07C 5/085 |
| 2024/0377950 A1* | 11/2024 | Lee | ...................... G06F 3/0647 |
| 2025/0018977 A1* | 1/2025 | Urano | .................. G07C 5/0841 |
| 2025/0033664 A1* | 1/2025 | Urano | .................. G07C 5/0841 |

FOREIGN PATENT DOCUMENTS

| | | |
|---|---|---|
| KR | 10-2021-0062530 A | 5/2021 |
| KR | 10-2022-0094718 A | 7/2022 |

* cited by examiner

*Primary Examiner* — Tasnima Matin
(74) *Attorney, Agent, or Firm* — Fish & Richardson P.C.

(57)          ABSTRACT

A storage device includes a memory device including a first memory region configured to store autonomous driving analysis data and a controller configured to control a memory operation of the memory device, wherein the controller includes a management circuit configured to monitor a plurality of pieces of target information related to autonomous driving, predict a shortage of the first memory region, and perform an operation to increase a free space of the first memory region based on a result of the prediction.

18 Claims, 16 Drawing Sheets

1

STORAGE DEVICE FOR STORING AUTONOMOUS DRIVING ANALYSIS DATA AND OPERATING METHOD OF THE SAME

CROSS-REFERENCE TO RELATED APPLICATION

This application is based on and claims priority under 35 U.S.C. § 119 to Korean Patent Application No. 10-2024-0012666, filed on Jan. 26, 2024, in the Korean Intellectual Property Office, the disclosure of which is incorporated by reference herein in its entirety.

BACKGROUND

The inventive concepts relate to storage devices, and more particularly, to storage devices providing memory spaces for storing autonomous driving analysis data and operating methods of the storage devices.

Autonomous driving technology is being developed to control and autonomously drive a vehicle to a given destination by recognizing surroundings without driver intervention and determining a driving situation.

In order to clearly determine liability in disputes related to accidents involving autonomous vehicles, data items that autonomous vehicles should record during autonomous driving and a method of recording the data items are being discussed. According to the discussion, autonomous driving analysis data corresponding to certain events that have occurred is required to be stored for a period of several weeks to several months, and the amount of autonomous driving analysis data is very large. Although storage devices mounted on autonomous vehicles provide a memory space in which a huge amount of autonomous driving analysis data is stored, there may be cases where a memory space for storing autonomous driving analysis data is insufficient while autonomous vehicles are driving due to the storage capacity limit of the storage devices.

SUMMARY

Some example embodiments of the inventive concepts provide a storage device for storing all autonomous driving analysis data by adaptively managing a memory region to reduce, minimize, or prevent a shortage of the memory region in which the autonomous driving analysis data is stored and an operating method of the storage device.

According to some example embodiments of the inventive concepts, there is provided a storage device including a memory device including a first memory region configured to store autonomous driving analysis data and a controller configured to control a memory operation of the memory device, wherein the controller includes a management circuit configured to monitor a plurality of pieces of target information related to autonomous driving, predict a shortage of the first memory region, and perform an operation to increase a free space of the first memory region based on a result of the prediction.

According to some example embodiments of the inventive concepts, there is provided an operating method of a storage device communicating with a host device including a plurality of zonal control units (ZCUs). The operating method includes storing first autonomous driving analysis data received from the host device in a first memory region, monitoring a plurality of pieces of target information related to autonomous driving and predicting a shortage of the first memory region, and performing an operation for increasing a free space of the first memory region.

According to some example embodiments of the inventive concepts, there is provided a storage device including a memory device including a first memory region and a second memory region, the first memory region operating to store autonomous driving analysis data received from a host, and the second memory region operating to store general data, and a controller configured to manage first autonomous driving analysis data stored in the first memory region, based on a policy initially set by the host, wherein the controller is further configured to perform an operation of monitoring second autonomous driving analysis data received from the host and predicting a shortage of the first memory region and selectively perform one of an operation of requesting the host to change the policy based on a result of the prediction and an operation of setting a part of the second memory region to operate as a memory region storing third autonomous driving analysis data to be received from the host.

BRIEF DESCRIPTION OF THE DRAWINGS

Example embodiments will be more clearly understood from the following detailed description taken in conjunction with the accompanying drawings in which.

DETAILED DESCRIPTION

Figure 1:
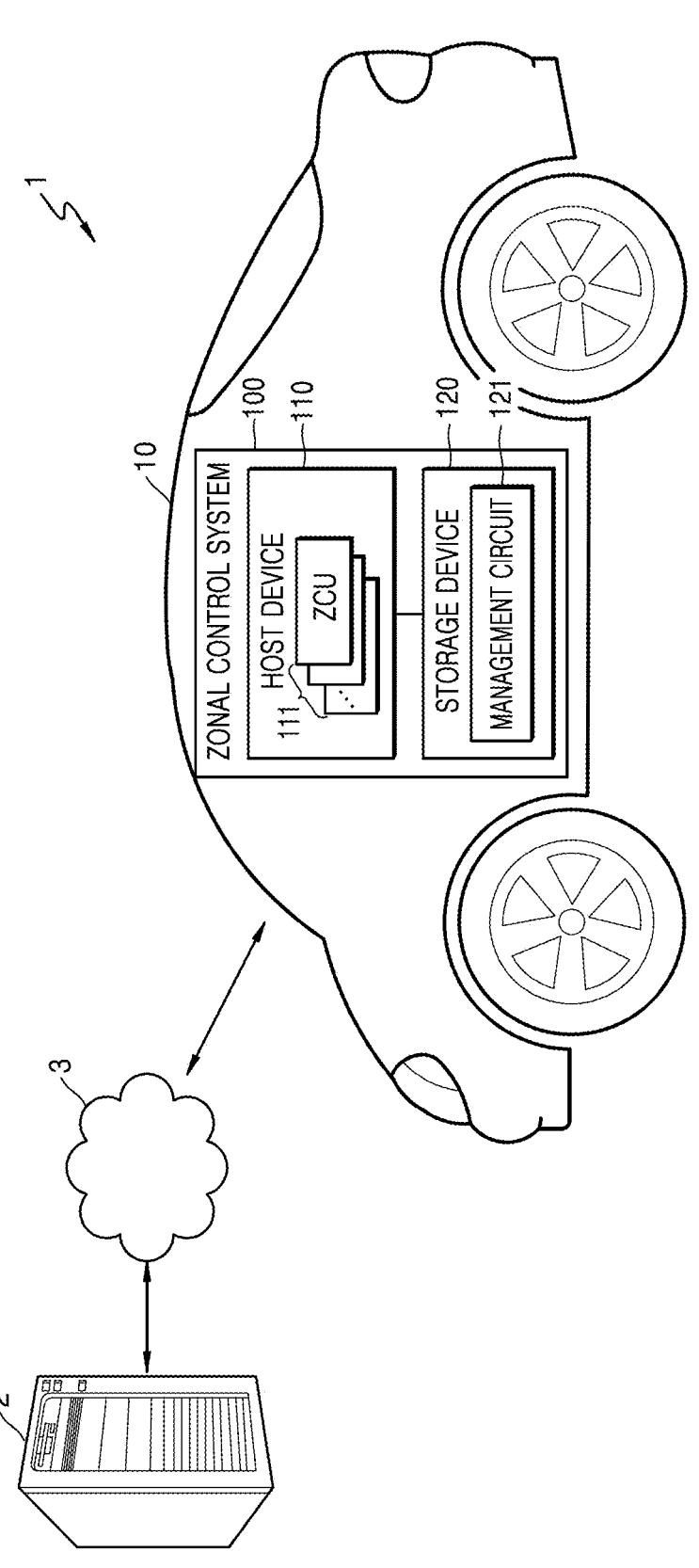
FIG. 1 is a schematic diagram of an autonomous driving system according to some example embodiments.

FIG. 1 is a schematic diagram of an autonomous driving system 1 according to some example embodiments.

Referring to FIG. 1, the autonomous driving system 1 may include an autonomous driving server 2, a network 3, and an autonomous vehicle 10. The autonomous driving server 2 may communicate with the autonomous vehicle 10 and control or support the operation of the autonomous vehicle 10 so that an autonomous driving service may be smoothly provided for a driver through the autonomous vehicle 10. For example, the autonomous driving server 2 may distribute firmware (or software) or data for updating the firmware to the autonomous vehicle 10 through the network 3. For example, the autonomous driving server 2 may provide real-time data necessary for autonomous driving or monitor the situation of the autonomous vehicle 10 through the network 3.

The network 3 may be implemented using vehicle communication technology, wireless Internet technology, short-range communication technology, or mobile communication technology. For example, wireless Internet technology may use at least one selected from the group consisting of a wireless local area network (WLAN), wireless broadband (Wibro), and world interoperability for microwave access (Wimax). For example, short-range communication technology may use at least one selected from the group consisting of Bluetooth, near field communication (NFC), radio frequency identification (RFID), infrared data association, ultra wideband (UWB), and ZigBee. For example, mobile communication technology may use at least one selected from the group consisting of new radio (NR), long term evolution (LTE), LTE-advanced, code division multiple access (CDMA), and global system for mobile communication (GSM).

In some example embodiments, the autonomous vehicle 10 may include a zonal control system 100 configured to support autonomous driving. The zonal control system 100 may include a host device 110, which includes a plurality of zonal control units (ZCUs) 111, and a storage device 120 providing a memory space for the host device 110. The storage device 120 may be shared by the ZCUs 111 and may store data generated by the ZCUs 111. Here, the ZCUs 111 may each include an electronic control unit (ECU) that controls a sensor and an actuator in a specific zone and may be located in various zones of the autonomous vehicle 10. Some example embodiments of the ZCUs 111 are described below. The inventive concepts may be applied to not only the zonal control system 100 including the ZCUs 111 but also an autonomous driving control system including a plurality of ECUs. At this time, the storage device 120 may be shared by the ECUs. Furthermore, the inventive concepts may also be applied to an autonomous driving control system including a plurality of domain controller units (DCUs) that integrate individual domains (or sensors) and process and control signals. At this time, the storage device 120 may be shared by the DCUs. Although description below is mainly of some example embodiments of the storage device 120 shared by the ZCUs 111 for convenience and consistency of the description, the inventive concepts are not limited thereto, as described above.

In some example embodiments, the storage device 120 may include a management circuit 121 that manages a first memory region operated (e.g., configured) to store autonomous driving analysis data received from one of the ZCUs 111 of the host device 110. For example, the management circuit 121 may be configured to manage the first memory region to store autonomous driving analysis data received from one of the ZCUs 111 of the host device 110. The first memory region may include a first memory cell array of the storage device 120, a first set of memory cells in a memory cell array of the storage device 120, a first memory (e.g., a first solid-state drive (SSD) memory, a first non-volatile memory, etc.) of the storage device 120, or the like. Herein, the management circuit 121 may be implemented by hardware, which is designed to specifically perform a management operation according to the inventive concepts, or software, which is designed to be executed by a processor such as a controller of the storage device 120. Furthermore, the management circuit 121 may be implemented by a combination of hardware and software. Herein, the operation of the management circuit 121 may interchangeably be used with the operation of the storage device 120 or a controller.

Hereinafter, some example embodiments in which the storage device 120 receives autonomous driving analysis data from a central ZCU among the ZCUs 111 are mainly presented, but these are just examples and the inventive concepts are not limited thereto. The storage device 120 may receive autonomous driving analysis data from at least one ZCU configured to generate the autonomous driving analysis data among the ZCUs 111. Herein, each of the ZCUs 111 may be referred to as a host. For convenience of description, it may be described that the storage device 120 receives autonomous driving analysis data from the host device 110.

Herein, autonomous driving analysis data may be generated in response to occurrence of a plurality of events during autonomous driving of the autonomous vehicle 10 and may include at least one selected from the group consisting of data on (e.g., data associated with) accident records of the autonomous vehicle 10, data for evaluating (e.g., data associated with evaluating) the safety performance of the autonomous vehicle 10, and data for safety monitoring (e.g., data associated with safety monitoring) of the autonomous vehicle 10. For example, a plurality of events related to (e.g., associated with) autonomous driving analysis data may be defined by an expert group (e.g., the United Nations Economic Commission for Europe) related to autonomous driving analysis. As a specific example, the events may include at least one of distance warning (applied to front and rear detection, vehicle-to-vehicle distance maintenance, and adaptive cruise control (ACC)), automatic cruise control (automatic driving while maintaining the speed and vehicle-to-vehicle distance set by a driver), collision prevention (actions, such as automatic breaking, necessary for safety before a collision occurs), parking assistance (using an ultrasonic sensor, detecting a vehicle-to-vehicle distance, and providing a warning sound), blind spot monitoring (blind spot detection and prevention of an accident that may occur when changing lanes), lane departure warning (detecting a lane and a driving direction and generating a warning sound in case of lane departure), sleepiness prevention (checking a driver's attentiveness and alertness and warning in case of inattention), adaptive light (providing optimal headlight conditions according to the road and driving direction), night vision (providing improved visibility to a driver during night driving), and/or pedestrian monitoring/avoidance (providing advance warning and avoidance of a pedestrian collision when driving at a low speed).

Herein, the storage device 120 may correspond to an event data recorder (EDR) or a data storage system for automated driving (DSSAD) of the autonomous vehicle 10.

In some example embodiments, the management circuit 121 may manage a second memory region that is operated to store general data received from the ZCUs 111 of the host device 110. For example, the management circuit 121 may be configured to manage the second memory region to store general data received from the ZCUs 111 of the host device

5

6

110. Herein, general data may include data that is generated by the ZCUs 111 for autonomous driving and firmware distributed by the autonomous driving server 2 or data for updating the firmware. In other words, general data may be defined as autonomous driving-related data other than autonomous driving analysis data. The second memory region may include a second memory cell array of the storage device 120, a second set of memory cells in a memory cell array of the storage device 120 that also includes the first set of memory cells, a second memory (e.g., a second solid state drive (SSD) memory, a second non-volatile memory, etc.) of the storage device 120, or the like. For example, the first and second memory regions may be separate sets of memory cells in a same memory cell array in the storage device 120 (e.g., in a same non-volatile memory of the storage device 120, in a same solid-state drive (SSD) storage device included in and/or implementing the storage device 120, etc.). For example, the first and second memory regions may be separate memory cell arrays and/or separate memory storage devices (e.g., separate non-volatile memories, separate solid-state drive (SSD) storage devices, etc.) of the storage device 120.

In some example embodiments, a policy (e.g., executed by the management circuit 121) for managing autonomous driving analysis data stored in the first memory region may be different from a policy (e.g., executed by the management circuit 121) for managing general data stored in the second memory region. For example, a policy for managing autonomous driving analysis data may ensure that the autonomous driving analysis data is stored in the first memory region as undamaged as possible for a certain time period.

In some example embodiments, the management circuit 121 may monitor a plurality of pieces of target information related to autonomous driving, predict a shortage of the first memory region, and perform an operation for increasing (e.g., an operation to increase) a free space of the first memory region based on a result of the prediction. In some example embodiments, the management circuit 121 may monitor received autonomous driving analysis data and predict a shortage of the first memory region. In some example embodiments, a plurality of pieces of target information monitored by the management circuit 121 may include information referred to for predicting whether a huge amount of autonomous driving analysis data is to be frequently generated in the future during autonomous driving of the autonomous vehicle 10. For example, target information may include driver setting information regarding options set by a driver of the autonomous vehicle 10 to receive desired autonomous driving services, driver characteristic information regarding a driver's unique habits related to autonomous driving, a driver specific autonomous driving history, or the like, remaining space information of the first memory region (e.g., information indicating free space of the first memory region), and/or autonomous driving analysis data reception information regarding reception trend of autonomous driving analysis data detected by the storage device 120.

In some example embodiments, to increase a free space of the first memory region, the management circuit 121 may trigger a change of a policy for managing autonomous driving analysis data stored in the first memory region or set a part of the second memory region as a memory region for storing the autonomous driving analysis data. For example, the management circuit 121 may actively provide the host device 110 with a request for changing a policy for managing autonomous driving analysis data stored in the first memory region, and the policy may be changed by the host device 110. For example, the management circuit 121 may adaptively set to allow a part of the second memory region to be used as the first memory region.

According to some example embodiments, the storage device 120 may be controlled by the management circuit 121 to monitor a plurality of pieces of target information, predict a shortage of the first memory region storing autonomous driving analysis data, and adaptively perform an operation for increasing a free space of the first memory region, thereby storing a huge amount of autonomous driving analysis data by efficiently using a limited memory space.

Figure 2:
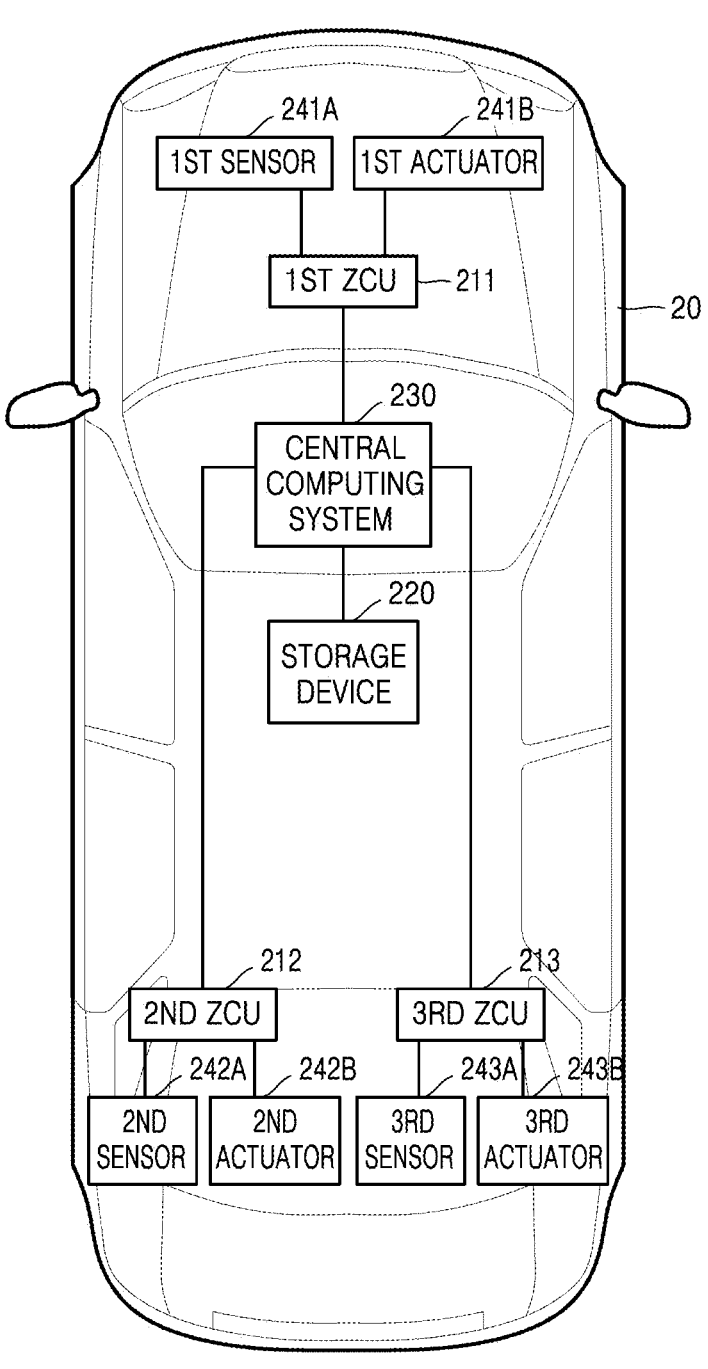
FIG. 2 is a schematic diagram of an autonomous vehicle according to some example embodiments.

FIG. 2 is a schematic diagram of an autonomous vehicle 20 according to some example embodiments. FIG. 2 illustrates only components necessary to explain the inventive concepts. In some example embodiments, the autonomous vehicle 20 may include more components than the illustrated ones.

Referring to FIG. 2, the autonomous vehicle 20 may include 1st to 3rd ZCUs 211, 212, and 213, a storage device 220, a central computing system 230, 1st to 3rd sensors 241A, 242A, and 243A, and 1st to 3rd actuators 241B, 242B, and 243B. Herein, the central computing system 230 may be referred to as a central ZCU 230. According to whether a component included in the autonomous vehicle 20 is an ECU or a DCU, the central computing system 230 may be referred to as a central ECU or a central DCU.

In some example embodiments, the 1st ZCU 211 may be located at a first position in the autonomous vehicle 20 and may control the 1st sensor 241A and the 1st actuator 241B, which are close to the 1st ZCU 211. The 1st ZCU 211 may be connected to the 1st sensor 241A and the 1st actuator 241B through a wired or wireless link. The 2nd ZCU 212 may be located at a second position in the autonomous vehicle 20 and may control the 2nd sensor 242A and the 2nd actuator 242B, which are close to the 2nd ZCU 212. The 2nd ZCU 212 may be connected to the 2nd sensor 242A and the 2nd actuator 242B through a wired or wireless link. The 3rd ZCU 213 may be located at a third position in the autonomous vehicle 20 and may control the 3rd sensor 243A and the 3rd actuator 243B, which are close to the 3rd ZCU 213. The 3rd ZCU 213 may be connected to the 3rd sensor 243A and the 3rd actuator 243B through a wired or wireless link. The 1st to 3rd ZCUs 211, 212, and 213 may support all functions in the local sub-region of the autonomous vehicle 20. For example, each of the 1st to 3rd ZCUs 211, 212, and 213 may perform control, data processing, and data management on one of the 1st to 3rd sensors 241A, 242A, and 243A and one of the 1st to 3rd actuators 241B, 242B, and 243B, which are close to a particular position in the autonomous vehicle 20.

For example, the central computing system 230 may be connected to the 1st to 3rd ZCUs 211, 212, and 213 by a wireless or wired link through a gateway and receive data generated by the 1st to 3rd ZCUs 211, 212, and 213. The central computing system 230 may determine whether a plurality of events occur based on the received data and generate autonomous driving analysis data based on a result of the determination. The central computing system 230 may generate data related to the driver setting information and the driver characteristic information, which are described above. The central computing system 230 may perform general control and management operations on the 1st to 3rd ZCUs 211, 212, and 213. In some example embodiments, the central computing system 230 may be configured to support a function, such as an advanced driver assistance system (ADAS) function or an in-vehicle infotainment (IVI) function.

In some example embodiments, the storage device 220 may be connected to the 1st to 3rd ZCUs 211, 212, and 213 and the central computing system 230 through a wireless or wired link and store and manage a plurality of pieces of data generated by the 1st to 3rd ZCUs 211, 212, and 213 and the central computing system 230. As described above, the storage device 220 may be shared by the 1st to 3rd ZCUs 211, 212, and 213 and the central computing system 230 and implemented using electrical & electronic (E&E) architecture. As a storage medium shared by the 1st to 3rd ZCUs 211, 212, and 213 and the central computing system 230, the storage device 220, to which the inventive concepts is applied, may efficiently provide a memory space.

In some example embodiments, the storage device 220 may receive autonomous driving analysis data from the central computing system 230, monitor the autonomous driving analysis data, and predict a shortage of the first memory region storing the autonomous driving analysis data. In detail, the storage device 220 may monitor a plurality of pieces of target information, which include at least one of (e.g., some or all of) data related to driver setting information and/or data related to driver characteristic information that are received from the central computing system 230, and predict whether the first memory region storing the autonomous driving analysis data is insufficient. Furthermore, the storage device 220 may predict the amount of insufficient capacity when a shortage of the first memory region is predicted. In some example embodiments, when (e.g., in response to a determination that) a shortage of the first memory region is predicted, the storage device 220 may adaptively perform an operation for increasing a free space of the first memory region.

In some example embodiments, the autonomous vehicle 20 may support a vehicle communication network technology. The 1st to 3rd ZCUs 211, 212, and 213, the storage device 220, the central computing system 230, i.e., the central ZCU 230, the 1st to 3rd sensors 241A, 242A, and 243A, and the 1st to 3rd actuators 241B, 242B, and 243B may communicate based on the vehicle communication network technology. For example, the vehicle communication network technology may include at least one selected from the group consisting of controller area network (CAN), local interconnect network (LIN), in-vehicle Ethernet, FlexRay, and media oriented system transport (MOST).

In some example embodiments, the 1st to 3rd sensors 241A, 242A, and 243A may include at least one selected from the group consisting of an object detector, an internal camera, and a sensing unit. The object detector may detect external objects and include a camera, a RADAR, a LiDAR, or the like. The internal camera may detect a driver or a passenger. The sensing unit may include at least one selected from the group consisting of an inertial navigation unit (INU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a steering sensor based on the rotation of a steering wheel, a temperature sensor for the inside of a vehicle, a humidity sensor for the inside of a vehicle, an ultrasonic sensor, an illumination sensor, an accelerator pedal position sensor, and a brake pedal position sensor.

In some example embodiments, the 1st to 3rd actuators 241B, 242B, and 243B may include at least one selected from the group consisting of a brake (e.g., an anti-lock braking system (ABS), a vehicle body control device (e.g., an electronic stability control (ESC) system), a steering device (e.g., a motor driven power steering (DPS) system), an active airbag system, and a seat belt system.

However, the autonomous vehicle 20 of FIG. 2 is just an example, and the inventive concepts are not limited thereto. The autonomous vehicle 20 may include more ZCUs, sensors, or actuators, and the arrangement of the ZCUs, sensors, or actuators may vary.

Figure 3:
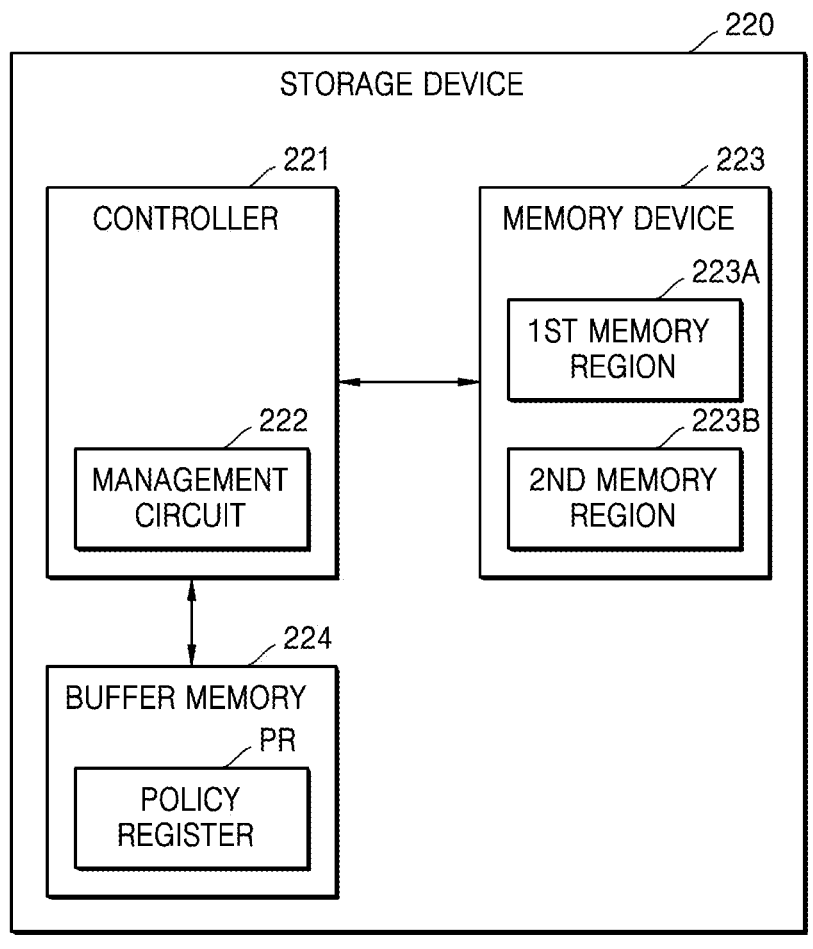
FIG. 3 is a block diagram of a storage device according to some example embodiments.

FIG. 3 is a block diagram of the storage device 220 according to some example embodiments.

Referring to FIG. 3, the storage device 220 may include a controller 221, a memory device 223, and a buffer memory 224.

In some example embodiments, the memory device 223 may include a first memory region 223A and a second memory region 223B. The first memory region 223A may be operated to store autonomous driving analysis data and may include a plurality of first non-volatile memories. The second memory region 223B may be operated to store general data and may include a plurality of second non-volatile memories. For example, the first and second non-volatile memories may include NAND flash memory, vertical NAND (VNAND) flash memory, NOR flash memory, resistive random access memory (RRAM), phase-change memory (PRAM), magnetoresistive random access memory (MRAM), ferroelectric random access memory (FRAM), or spin transfer torque RAM (STT-RAM). In some example embodiments, the first and second non-volatile memories may be implemented having a three-dimensional array structure. In some example embodiments, the first memory region 223A and the second memory region 223B may be separate memory cells of a same memory cell array of a same non-volatile memory. In some example embodiments, the first memory region 223A and the second memory region 223B may be separate sets of one or more non-volatile memories.

In some example embodiments, the controller 221 may include a management circuit 222. The management circuit 222 may store autonomous driving analysis data in the first memory region 223A and manage the stored autonomous driving analysis data based on a first policy set in a policy register PR of the buffer memory 224 (e.g., stored at one or more memory cells of a non-volatile memory of the buffer memory 224). In some example embodiments, the policy register PR may be included in (e.g., stored in one or more memory cells of) the memory device 223 or the controller 221. The values of parameters of the policy register PR may be backed up to the memory device 223 when (e.g., based on) the storage device 220 is powered off.

In some example embodiments, the management circuit 222 may periodically or non-periodically monitor a plurality of pieces of target information (which may be stored in one or more memory cells of the first memory region 223A of the memory device 223) and predict whether the first memory region 223A is insufficient. For example, the management circuit may, based on such monitoring, determine that a size of a free space of the first memory region 223A is smaller than a threshold value corresponding to accommodating future autonomous driving analysis data received at the storage device 220 to be stored in the memory device 223 within a certain future time period, such that the free space is predicted to be insufficiently large to accommodate future autonomous driving analysis data that is predicted to be received at the storage device 220 for storage at the first memory region 223A within a certain future time period. Threshold values used to implement the prediction may be stored at one or more of the controller 221, the memory device 223, or the buffer memory 224 and may be accessed therefrom by the management circuit 222 to implement the prediction determination. In another example, the management circuit may, based on such monitoring, determine that a size of a free space of the first memory region 223A is smaller than a predicted size of future autonomous driving analysis data that is predicted to be received at the storage device 220 to be stored in the memory device 223 within a certain future time period, such that the free space is predicted to be insufficiently large to accommodate future autonomous driving analysis data that is predicted to be received at the storage device 220 for storage at the first memory region 223A within a certain future time period. As described herein, a "future time period" may be a particular period of time, for example 1 day, 7 days, 10 days, 30 days, 60 days, 90 days, or the like. In a specific example, the management circuit 222 may monitor a plurality of pieces of target information whenever receiving autonomous driving analysis data from a central ZCU (e.g., in response to a determination at the controller 221 that the autonomous driving analysis data is received at the storage device 220 from the central ZCU), whenever the amount of autonomous driving analysis data received from the central ZCU exceeds a threshold value (e.g., in response to a determination at the controller 221 that an amount, or size, of autonomous driving analysis data that is received at the storage device 220 from the central ZCU exceeds a threshold value, where the threshold value may be stored at, and accessed from, the controller 221, the memory device 223, or the like), or whenever at least one of the pieces of target information is changed (e.g., in response to a determination at the controller 221 that at least one of the pieces of target information is changed). The management circuit 222 may start monitoring a plurality of pieces of target information when (e.g., in response to a determination that) a free space of the first memory region 223A (e.g., a data size of a set of memory cells of the first memory region 223A at which autonomous driving analysis data is not stored) is less than a threshold size.

In some example embodiments, when a shortage of the first memory region 223A is predicted (e.g., in response to a determination that a size of a free space of the first memory region 223A is smaller than a threshold value corresponding to accommodating future autonomous driving analysis data within a certain future time period, such that the free space is predicted to be insufficiently large to accommodate future autonomous driving analysis data that is predicted to be received at the storage device 220 for storage at the first memory region 223A within a certain future time period), the management circuit 222 may generate a policy change request for changing the first policy set in the policy register PR and transmit the policy change request to the central ZCU. In some example embodiments, the management circuit 222 may determine a second policy desired based on a result of monitoring a plurality of pieces of target information and include information indicating the second policy in the policy change request. In some example embodiments, the central ZCU may change the first policy set in the policy register PR into another policy in response to the policy change request. In some example embodiments, the central ZCU may change the first policy set in the policy register PR into the second policy, considering the policy desired by the management circuit 222.

In some example embodiments, when a shortage of the first memory region 223A is predicted (e.g., in response to a determination that the free space of the first memory region

223A not presently storing autonomous driving analysis data is predicted to be insufficient in size to accommodate a size of autonomous driving analysis data predicted to be received at the storage device 220 to be stored in the first memory region 223A in a future time period, for example based on a determination that the size of the free space is smaller than a threshold value), the management circuit 222 may set a part of the second memory region 223B to operate to store autonomous driving analysis data. In other words, the management circuit 222 may set a part of the second memory region 223B to operate as the first memory region 223A. Such a setting of a part of the second memory region 223B to operate as the first memory region 223A, such that at least a part of autonomous driving analysis data received at the storage device 220 in a future time period may be stored at the part of the second memory region 223B instead of the initial first memory region 223A, may effectively increase the size of the free space of the memory region at which autonomous driving analysis data is stored in the memory device 223, such memory region referred to as the "first memory region". Thus, the free space of the "first memory region" may be increased to include both the free space of the first memory region 223A and at least a portion of free space of the second memory region 223B. Such a combination of free spaces of the first and second memory regions 223A and 223B may be referred to as a combined memory region, an expanded first memory region, an enlarged first memory region, or the like.

As a result of setting a part of the second memory region 223B to operate as the first memory region 223A, the management circuit 222 may configure the memory device 223 to increase the effective free space of the "first memory region" at which autonomous driving analysis data predicted to be received at the storage device 220 may be stored in a future time period even if the size of such future autonomous driving analysis data is greater than the present free space of the initial first memory region 223A. Accordingly, the functionality (e.g., storage capacity) of the storage device 220 to store sufficient amounts of autonomous driving analysis data to support autonomous driving (e.g., the storage capacity of the storage device 220 to store sufficient amounts of autonomous driving analysis data to facilitate determinations of liability in disputes related to accidents involving autonomous vehicles) may be improved, thereby reducing, minimizing, or preventing a storage space shortage at the storage device to store autonomous driving analysis data and securing a sufficient space for storing such autonomous driving analysis data. Based on securing sufficient space for such autonomous driving analysis data, the storage device 220 may be configured to enable sufficient autonomous driving analysis data to be stored for use to improve autonomous driving (e.g., to facilitate determinations of liability in disputes related to accidents involving autonomous vehicles).

In some example embodiments, the management circuit 222 may store autonomous driving analysis data in the first memory region 223A having an increased free space and continuously monitor whether the first memory region 223A is insufficient. The management circuit 222 may additionally perform an operation for increasing a free space of the first memory region 223A (e.g., based on setting at least a portion of the second memory region 223B to operate as the first memory region 223A), based on a result of the monitoring.

In some example embodiments, after performing (e.g., in response to performing) an operation for increasing a free space of the first memory region 223A (e.g., based on setting at least a portion of the second memory region 223B to operate as the first memory region 223A), the management circuit 222 may determine whether the free space of the first memory region 223A (e.g., the free space of the initial first memory region 223A, excluding the portion of the second memory region 223B that is set to operate as the first memory region 223A) is sufficient (e.g., is greater than or equal to a size of autonomous driving analysis data predicted to be received at the storage device 220 to be stored in the first memory region 223A in a future time period). When it is determined that the free space of the first memory region 223A is sufficient, the management circuit 222 may recover the first memory region 223A to the original state. In detail, the management circuit 222 may recover the policy changed in the policy register PR or recover the setting so that general data is stored in the part of the second memory region 223B.

In some example embodiments, the management circuit 222 may determine whether a free space of the second memory region 223B is insufficient (e.g., is smaller than a size of autonomous driving analysis data predicted to be received at the storage device 220 to be stored in the first memory region 223A in a future time period) and set a part of the first memory region 223A to operate as a memory storing general data when (e.g., in response to a determination that) the free space of the second memory region 223B is determined to be insufficient.

Figure 4:
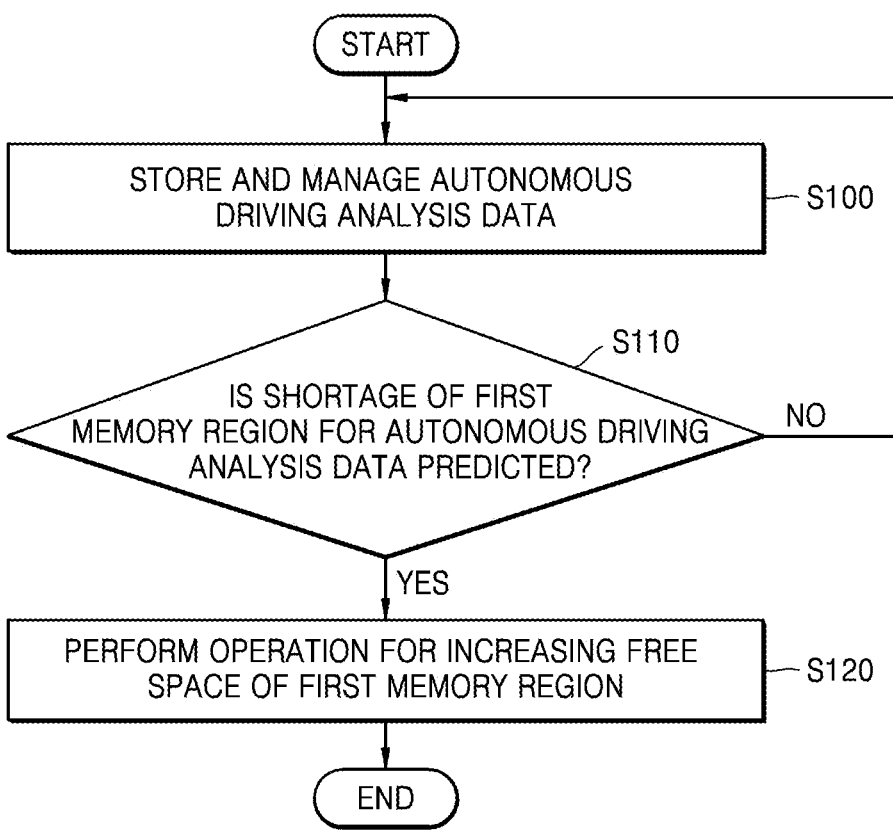
FIG. 4 is a flowchart of an operating method of a storage device, according to some example embodiments.

FIG. 4 is a flowchart of an operating method of a storage device, according to some example embodiments. The operating method shown in FIG. 4 may be implemented by any of the example embodiments of a storage device, including the storage device 220 shown in FIG. 2, the storage device 220 shown in FIG. 3, the storage device 120 shown in FIG. 1, or the like.

Referring to FIG. 4, the storage device may store and manage autonomous driving analysis data in operation S100.

The storage device may determine whether a shortage of a first memory region storing the autonomous driving analysis data is predicted, in operation S110. In some example embodiments, the storage device may monitor a plurality of pieces of target information related to autonomous driving and predict a shortage of the first memory region based on a result of the monitoring. In some example embodiments, the storage device may additionally predict the amount of insufficient capacity. For example, at S110, the storage device (e.g., management circuit) may determine whether a size of a free space of the first memory region that is not presently storing autonomous driving analysis data and is available to store future autonomous driving analysis data received in a future time period is smaller than a size of autonomous driving analysis data predicted to be received at the storage device to be stored in the first memory region in a future time period. In response to a determination that the size of the free space of the first memory region is smaller than the size of autonomous driving analysis data predicted to be received at the storage device to be stored in the first memory region in a future time period, the free space of the first memory region may be predicted to be insufficiently large to accommodate future autonomous driving analysis data that is predicted to be received at the storage device for storage at the first memory region within a future time period, such that the shortage of the first memory region storing the autonomous driving analysis data is predicted (S110=YES).

In the case of YES in operation S110, the storage device may perform an operation for increasing a free space of the first memory region in operation S120. In some example embodiments, the storage device may perform an operation of changing a policy corresponding to the first memory region or an operation of setting a part of a second memory region to operate as the first memory region, for example thereby effectively increasing the size of the memory region used to operate as the "first memory region" to include at least the part of the second memory region in addition to the free space of the "actual" first memory region.

In the case of NO in operation S110 (e.g., the size of the free space of the first memory region 223A that is not presently storing autonomous driving analysis data and is available to store future autonomous driving analysis data received in a future time period is determined to be equal to or greater than the threshold value), the operating method of a storage device may proceed to operation S100.

Figure 5:
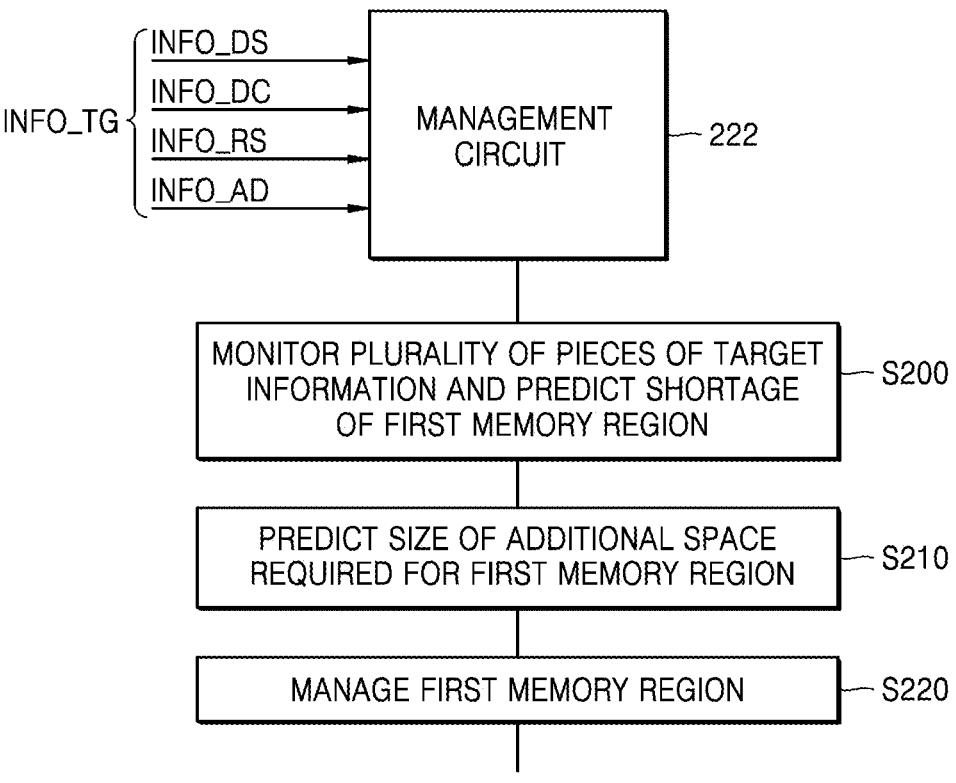
FIG. 5 is a flowchart of an operating method of a management circuit, according to some example embodiments.

FIG. 5 is a flowchart of an operating method of the management circuit 222, according to some example embodiments. The operating method shown in FIG. 5 may be implemented by any of the example embodiments of a management circuit, including the management circuit 222 shown in FIG. 3, the management circuit 121 shown in FIG. 1, or the like.

Referring to FIG. 5, the management circuit 222 may receive a plurality of pieces of target information INFO_TG. For convenience of description, it is illustrated in FIG. 5 that the management circuit 222 receives all target information INFO_TG, but this is just an example and the inventive concepts are not limited thereto. Part of the target information INFO_TG may be generated by the management circuit 222.

In some example embodiments, the target information INFO_TG may include at least one of driver setting information INFO_DS, driver characteristic information INFO_DC, remaining space information INFO_RS, and/or autonomous driving analysis data reception information INFO_AD.

In some example embodiments, the driver setting information INFO_DS may include information about (e.g., associated with) an autonomous driving level selected by a driver from among a plurality of autonomous driving levels, information about (e.g., associated with) autonomous driving options set by the driver, and/or the like. In some example embodiments, the driver characteristic information INFO_DC may be generated by the central ZCU 230 in FIG. 2.

In some example embodiments, the driver characteristic information INFO_DC may include information about (e.g., associated with) a time (or a driving time) during which a driver uses autonomous driving services, information about (e.g., associated with) a driver's habits when using autonomous driving services, and/or the like. In some example embodiments, the driver characteristic information INFO_DC may be generated by the central ZCU 230 in FIG. 2.

In some example embodiments, the remaining space information INFO_RS may include information about (e.g., associated with) the remaining space (e.g., free space) of the first memory region operated to store autonomous driving analysis data. In some example embodiments, the remaining space information INFO_RS may be generated by the memory device 223 in FIG. 3.

In some example embodiments, the autonomous driving analysis data reception information INFO_AD may include information about (e.g., associated with) reception trends according to the amount of received autonomous driving analysis data, reception frequency, and/or the like. In some example embodiments, the autonomous driving analysis data reception information INFO_AD may be generated by the management circuit 222.

The management circuit 222 may monitor the pieces of target information INFO_TG and predict a shortage of the first memory region in operation S200. In some example embodiments, the management circuit 222 may predict the amount of autonomous driving analysis data to be received in the future (e.g., a size of future autonomous driving analysis data predicted to be received at the storage device 220 to be stored at the first memory region 223A in a particular future time period, which may be a particular future period of time that may be stored at the controller 221, the buffer memory 224, or the memory device 223), based on the pieces of target information INFO_TG, and predict a shortage of the first memory region by comparing the predicted amount with a free space of the first memory region, for example to predict whether the size of future autonomous driving analysis data predicted to be received at the storage device 220 to be stored at the first memory region 223A in a particular future time period is greater than the size of the free space of the first memory region 223A. In some example embodiments, the management circuit 222 may input the pieces of target information INFO_TG into a certain function and check an output of the certain function to predict a shortage of the first memory region. Furthermore, the management circuit 222 may apply different weights to the pieces of target information INFO_TG and predict a shortage of the first memory region based on differently weighted pieces of target information INFO_TG. In some example embodiments, a size of future autonomous driving analysis data predicted to be received at the storage device 220 to be stored at the first memory region 223A in a particular future time period may be a fixed amount value that may be stored at the controller 221, the buffer memory 224, or the memory device 223, or a location external to the storage device 220, and the management circuit 222 may access the fixed amount value of the size of future autonomous driving analysis data predicted to be received at the storage device 220 to be stored at the first memory region 223A in a particular future time period and determine a difference (e.g., via subtraction) of the fixed amount value with a present value of the free space of the first memory region 223A which may be indicated by the remaining space information INFO_RS that may be generated by the memory device 223 and transmitted to the controller 221. The management circuit 222 may predict a shortage of the first memory region based on a determination that the fixed amount value of the size of future autonomous driving analysis data predicted to be received at the storage device 220 to be stored at the first memory region 223A in a particular future time period is greater than the present value of the free space of the first memory region 223A which may be indicated by the remaining space information INFO_RS. As described herein, the future time period, the certain future time period, particular future time period, or the like may be a particular period of time (e.g., 1 day, 7 days, 30 days, 90 days, etc.) represented by a particular value that may be stored at a memory device of the storage device 220 (e.g., the memory device 223, the buffer memory 224, etc.) and may be accessed by the controller 221 (e.g., the management circuit 222).

In some example embodiments, the present value of the free space of the first memory region 223A, which may be indicated by the remaining space information INFO_RS, may be determined based on the management circuit 222 and/or the memory device 223 tracking memory cells of the first and/or second memory regions 223A and/or 223B to which various data is stored so as to track which memory cells of the first and/or second memory regions 223A and/or 223B are storing autonomous driving analysis data, which memory cells of the first and/or second memory regions 223A and/or 223B are storing general data, which memory cells of the first and/or second memory regions 223A and/or 223B are not presently storing any data, which memory cells of the first and/or second memory regions 223A and/or 223B are not presently storing any autonomous driving analysis data, and the like. Such tracking may include maintaining and updating, by the memory device 223 and/or the controller 221, a database of memory cells of the first and/or second memory regions 223A and/or 223B and corresponding indications of data stored (or not stored) at the respective memory cells. The remaining space information INFO_RS may be generated at the memory device 223 and/or the management circuit 222 based on accessing the table to identify memory cells of the first memory region 223A not presently storing any autonomous driving analysis data and generating the remaining space information INFO_RS indicating a corresponding memory storage capacity, or "free space" of the first memory region 223A. In some example embodiments, the remaining space information INFO_RS may be generated based on querying the memory cells of the first and/or second memory regions 223A and/or 223B to determine which memory cells are presently storing or not storing data and further identifying the memory storage capacity corresponding to memory cells determined, based on the querying, to not be storing any data as the present "free space" of the first and/or second memory regions 223A and/or 223B. In some example embodiments, a controller (e.g., controller 221) of a storage device (e.g., storage device 220) manages free blocks in a first memory region 223A and selects at least one of the free blocks to use for garbage collection in a second memory region 223B.

The management circuit 222 may predict the size of an additional space required by the first memory region in operation S210 (e.g., an additional free space of the first memory region to cause the free space of the first memory region to be equal to or greater than the size of future autonomous driving analysis data predicted to be received at the storage device 220 to be stored at the first memory region 223A in the particular future time period). In some example embodiments, the management circuit 222 may predict the additionally required space based on the difference between the amount predicted in operation S200 (e.g., the size of future autonomous driving analysis data predicted to be received at the storage device 220 to be stored at the first memory region 223A in a particular future time period) and the free space of the first memory region (e.g., the size of the present free space of the first memory region 223A).

In operation S220, the management circuit 222 may manage the first memory region based on operations S200 and S210. In some example embodiments, the management circuit 222 may perform an operation for increasing (e.g., to increase) a free space of the first memory region (e.g., based on setting at least a part of the second memory region to operate as a "part" of the first memory region, such that future autonomous driving analysis data received at the storage device 220 to be stored at the first memory region 223A in a particular future time period may be stored in the free space of the first memory region 223A and/or the part of the second memory region 223B that is 'set' to operate as a part of the first memory region).

Figure 6:
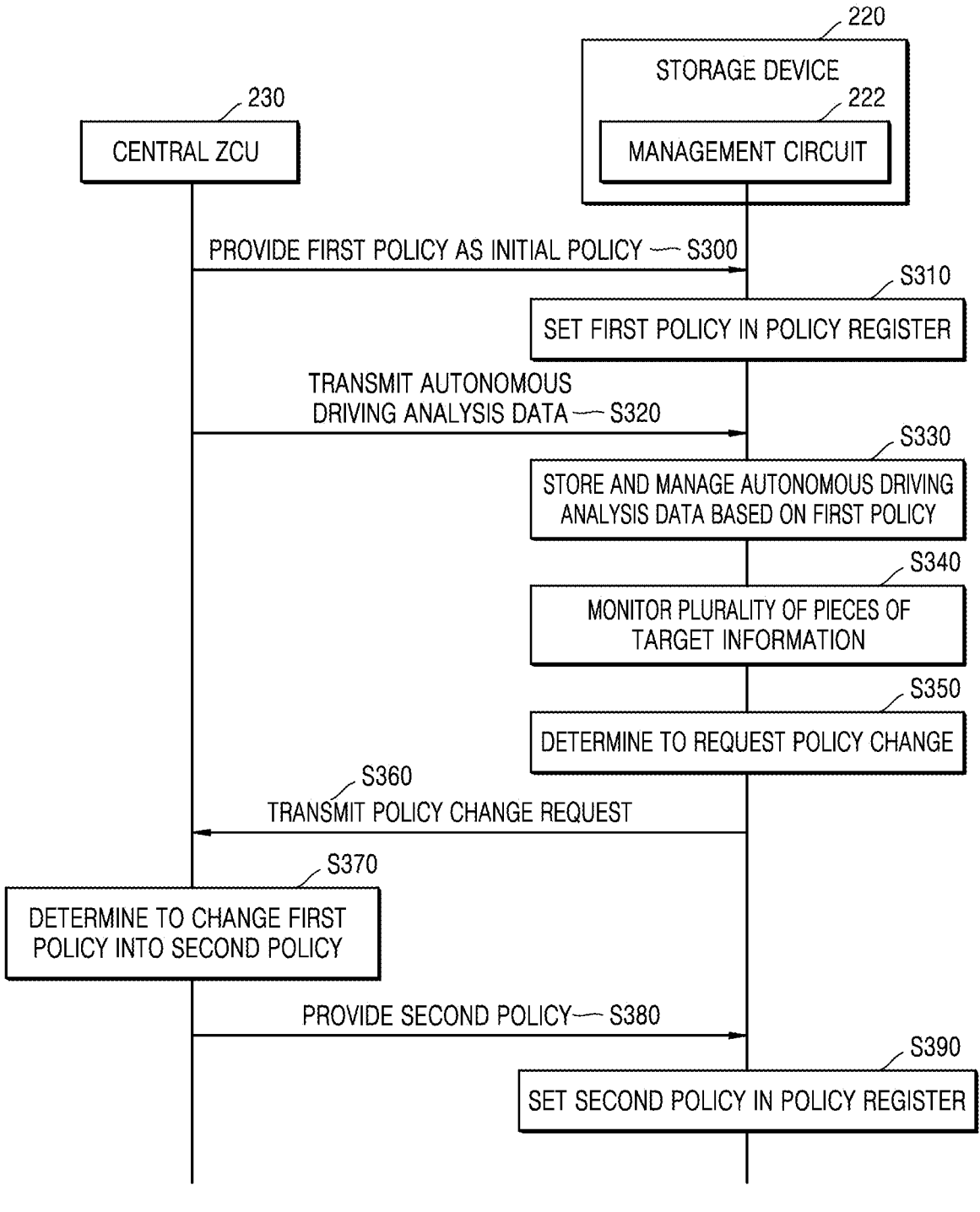
FIG. 6 is a flowchart of an operating method of a storage device and a central zonal control unit (ZCU), according to some example embodiments.

FIG. 6 is a flowchart of an operating method of the storage device 220 and the central ZCU 230, according to some example embodiments. The operating method shown in FIG. 6 may be implemented by any of the example embodiments of a storage device, including the storage device 220 shown in FIG. 2, the storage device 220 shown in FIG. 3, the storage device 120 shown in FIG. 1, or the like. In FIG. 6, the storage device 220 may include the management circuit 222. The operations described below may be performed by the management circuit 222. In some example embodiments, the operations of the central ZCU 230 in FIG. 6 may be replaced with the operations of at least one of the ZCUs 111 of the host device 110 in FIG. 1.

The central ZCU 230 may provide the storage device 220 with the first policy as the initial policy in operation S300. In some example embodiments, the central ZCU 230 may provide the storage device 220 with the first policy as the initial policy for managing autonomous driving analysis data to be stored in the first memory region of the storage device 220.

The storage device 220 may set the first policy in a policy register in operation S310. In some example embodiments, the storage device 220 may set the first policy in the policy register based on the first policy provided in operation S300.

The central ZCU 230 may transmit the autonomous driving analysis data to the storage device 220 in operation S320.

In operation S330, the storage device 220 may store and manage the autonomous driving analysis data based on the first policy set in the policy register (e.g., based on accessing the "set" policy that is the first policy from the policy register based on receiving the autonomous driving analysis data at S320). In some example embodiments, the storage device 220 may store the received autonomous driving analysis data in the first memory region and manage the stored autonomous driving analysis data based on the first policy.

The storage device 220 may monitor a plurality of pieces of target information related to autonomous driving in operation S340. In some example embodiments, the storage device 220 may receive or generate and monitor the pieces of target information.

The storage device 220 may predict a shortage of the first memory region based on a result of the monitoring in operation S340 and determine to request a policy change of the first policy according to the shortage prediction in operation S350. For example, at S340, the storage device 220 (e.g., management circuit 222) may determine whether a size of a free space of the first memory region that is not presently storing autonomous driving analysis data and is available to store future autonomous driving analysis data received in a future time period is smaller than a threshold value corresponding to accommodating future autonomous driving analysis data within a certain future time period. In response to a determination that the size of the free space of the first memory region is smaller than the threshold value, the free space may be predicted to be insufficiently large to accommodate future autonomous driving analysis data that is predicted to be received at the storage device for storage at the first memory region within a certain future time period, such that the shortage of the first memory region may be predicted at S340. In some example embodiments, as the shortage of the first memory region is predicted, the storage device 220 may determine to request a change of the first policy in order to increase a free space of the first memory region and may generate a policy change request.

The storage device 220 may transmit the policy change request to the central ZCU 230 in operation S360. In some example embodiments, the storage device 220 may include information indicating a desired policy in the policy change request and propose that the central ZCU 230 change the first policy into the desired policy.

The central ZCU 230 may determine to change the first policy into a second policy in response to the policy change request in operation S370. In some example embodiments, the second policy may be a policy that is predetermined to replace the first policy when (e.g., in response to) the central ZCU 230 receives the policy change request or may be a policy that is arbitrarily determined by the central ZCU 230. In some example embodiments, the second policy may be a policy that is desired by the storage device 220 and included (e.g., indicated) in the policy change request.

The central ZCU 230 may provide the second policy determined in operation S370 to the storage device 220 in operation S380.

The storage device 220 may set the second policy in the policy register as the "set" policy in operation S390. In some example embodiments, the storage device 220 may remove the first policy from the policy register and set the second policy in the policy register or may overwrite the first policy with the second policy in the policy register.

Figure 7:
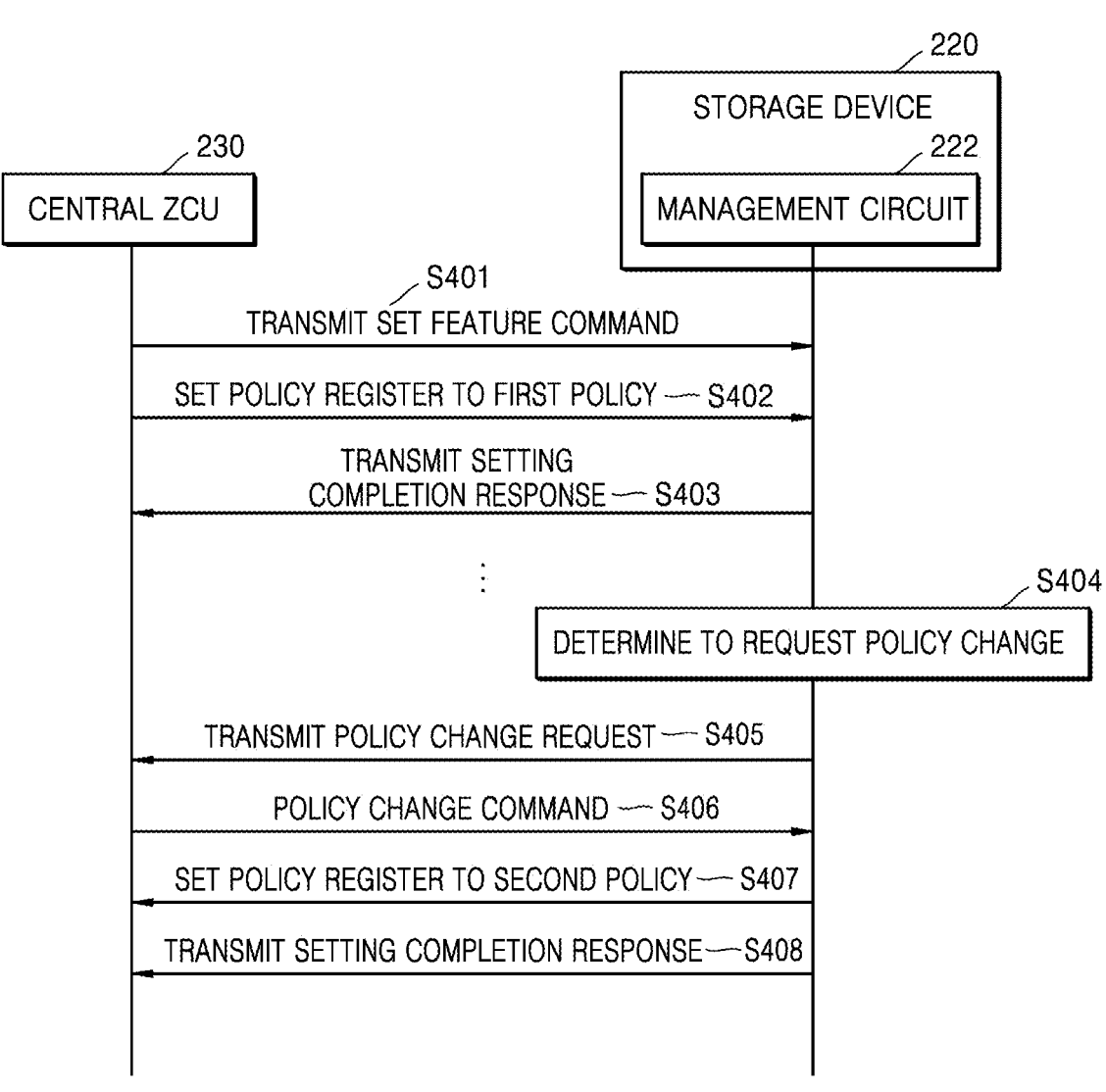
FIG. 7 is a detailed flowchart of an operating method of a storage device and a central ZCU, according to some example embodiments.

FIG. 7 is a detailed flowchart of an operating method of the storage device 220 and the central ZCU 230, according to some example embodiments. The operating method shown in FIG. 7 may be implemented by any of the example embodiments of a storage device, including the storage device 220 shown in FIG. 2, the storage device 220 shown in FIG. 3, the storage device 120 shown in FIG. 1, or the like. In FIG. 7, the storage device 220 may include the management circuit 222. The operations described below may be performed by the management circuit 222. In some example embodiments, the operations of the central ZCU 230 in FIG. 7 may be replaced with the operations of at least one of the ZCUs 111 of the host device 110 in FIG. 1.

Referring to FIG. 7, the central ZCU 230 may transmit a set feature command to the storage device 220 in operation S401. In some example embodiments, the central ZCU 230 may start setting options necessary for the operations of the storage device 220 through (e.g., based on receipt and processing of) the set feature command.

The central ZCU 230 may set the policy register of the storage device 220 to the first policy in operation S402. In some example embodiments, the storage device 220 may include the policy register in which a policy for managing autonomous driving analysis data is set. The policy register may be initially set to the first policy by the central ZCU 230. Although not shown in FIG. 6, the central ZCU 230 may also set a policy for managing general data in the policy register.

The storage device 220 may transmit a setting completion response, which indicates that the policy register has been set to the first policy, to the central ZCU 230 in operation S403. In some example embodiments, the storage device 220 may set the policy register to the first policy under control by the central ZCU 230 in operation S402 and may transmit the setting completion response to the central ZCU 230 after completing the setting. Thereafter, the storage device 220 may manage autonomous driving analysis data, which is received from the central ZCU 230 and stored in the first memory region of the storage device 220, based on the first policy. The storage device 220 may continuously receive the autonomous driving analysis data from the central ZCU 230.

The storage device 220 may determine to request a policy change of the first policy based on a result of monitoring a plurality of pieces of target information related to autonomous driving in operation S404. In some example embodiments, the storage device 220 may monitor a plurality of pieces of target information and predict a shortage of the first memory region. Accordingly, the storage device 220 may determine to transmit a policy change request to the central ZCU 230 to increase a free space of the first memory region.

With respect to the first policy set in the policy register, the storage device 220 may transmit a policy change request to the central ZCU 230 in operation S405. In some example embodiments, the storage device 220 may determine an optimal policy for resolving the shortage of the first memory region, based on a result of monitoring the pieces of target information, and may propose the determined optimal policy to the central ZCU 230 as a policy desired by the storage device 220. At this time, the policy change request may include information indicating a policy desired by the storage device 220.

The central ZCU 230 may transmit a policy change command for the policy register of the storage device 220 to the storage device 220 in response to the policy change request in operation S406.

The central ZCU 230 may set the policy register to the second policy in operation S407. In some example embodiments, the second policy may be determined by the central ZCU 230. In some example embodiments, it may be agreed in advance that the second policy is selected when a policy change request occurs with respect to the first policy. In some example embodiments, the second policy may be desired by the storage device 220 and indicated by information included in the policy change request.

The storage device 220 may transmit a setting completion response, which indicates that the policy register has been set to the second policy, to the central ZCU 230 in operation S408. In some example embodiments, the storage device 220 may set the policy register to the second policy under control by the central ZCU 230 in operation S407 and may transmit the setting completion response to the central ZCU 230 after completing the setting. Thereafter, the storage device 220 may manage autonomous driving analysis data, which is received from the central ZCU 230 and stored in the first memory region of the storage device 220, based on the second policy.

Figure 8A:
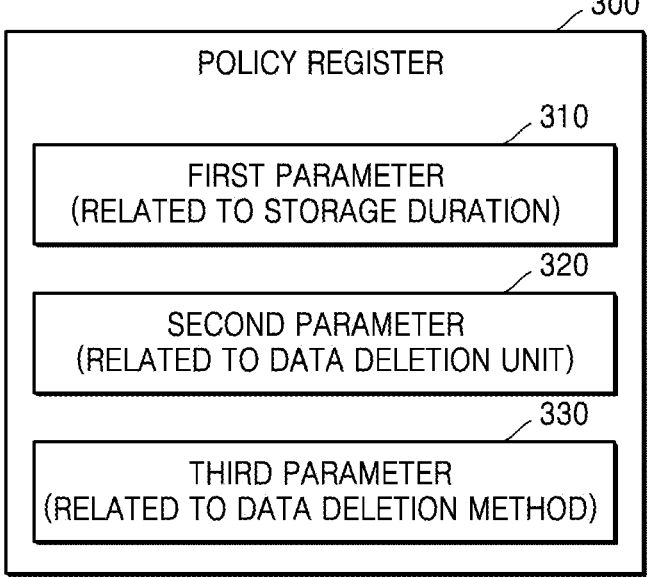
FIG. 8A is a diagram illustrating a policy register according to some example embodiments and FIG. 8B is a flowchart of a method of managing autonomous driving analysis data based on the policy register of FIG. 8A according to some example embodiments.
Figure 8B:
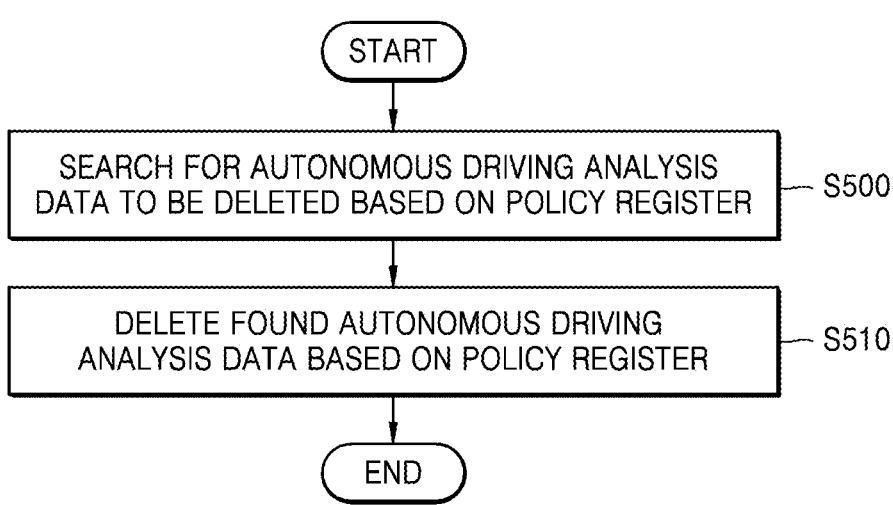

FIG. 8A is a diagram illustrating a policy register 300 according to some example embodiments and FIG. 8B is a flowchart of a method of managing autonomous driving analysis data based on the policy register 300 of FIG. 8A according to some example embodiments. The policy register 300 may be included in and/or implemented by the policy register PR in the buffer memory 224 of the storage device 220 shown in FIG. 3, but example embodiments are not limited thereto. The method shown in FIG. 8B may be implemented at any of the example embodiments of a storage device, including the storage device 220 shown in FIG. 2, the storage device 220 shown in FIG. 3, the storage device 120 shown in FIG. 1, or the like.

Referring to FIG. 8A, configurable parameters of the policy register 300 may include a first parameter 310, a second parameter 320, and a third parameter 330. In some example embodiments, a policy for autonomous driving analysis data may be set (e.g., as a "set" policy for managing the autonomous driving analysis data) as each of the first parameter 310, the second parameter 320, and the third parameter 330 has an arbitrary value.

In some example embodiments, the first parameter 310 may be related to the storage duration of autonomous driving analysis data.

In some example embodiments, the second parameter 320 may be related to a data deletion unit for (e.g., associated with) autonomous driving analysis data that has reached the expiration of the storage duration.

In some example embodiments, the third parameter 330 may be related to a data deletion method for (e.g., associated with) the autonomous driving analysis data that has reached the expiration of the storage duration.

In some example embodiments, when a shortage of a first memory region storing autonomous driving analysis data is predicted, a storage device may request a central ZCU to change a first policy set in the policy register 300 and change the first policy set in the policy register 300 into a second policy under control by the central ZCU.

In a specific example, the first parameter 310 of the second policy may be set to have a shorter storage duration than the first parameter 310 of the first policy. In other words, by changing a policy (e.g., the "set" policy for managing autonomous driving analysis data) to shorten the storage duration, the storage device may increase the amount of autonomous driving analysis data to be deleted because of the expiration of the storage duration, thereby securing a free space of the first memory region.

The second parameter 320 of the second policy may be set to have a larger data deletion unit than the second parameter 320 of the first policy. In other words, by changing a policy (e.g., the "set" policy for managing autonomous driving analysis data) to increase the amount of data deleted at a time, the storage device may quickly delete autonomous driving analysis data that has reached the expiration of the storage duration (e.g., 1 day, 7 days, 30 days, 90 days, or the like), thereby securing a free space of the first memory region.

The third parameter 330 of the second policy may be set to have a different data deletion method than the third parameter 330 of the first policy. For example, a data deletion method set in the third parameter 330 of the second policy may include a method of migrating autonomous driving analysis data, which has reached the expiration of the storage duration, to a cloud storage and a data deletion method set in the third parameter 330 of the first policy may include a method of generally deleting autonomous driving analysis data, which has reached the expiration of the storage duration. In some example embodiments, the cloud storage may be implemented by the autonomous driving server 2 and the network 3 in FIG. 1.

In some example embodiments, the first parameter 310, the second parameter 320, and the third parameter 330 may be complementary to each other. In a specific example, as autonomous driving analysis data may be migrated to a cloud storage according to the third parameter 330 of the second policy, the storage duration may be reduced through the first parameter 310 or the data deletion unit may be increased through the second parameter 320.

Referring further to FIG. 8B, the storage device may search for autonomous driving analysis data to be deleted, based on the policy register 300 (e.g., based on the "set" policy for managing autonomous driving analysis data to which the policy register is "set"), in operation S500. In some example embodiments, among pieces of autonomous driving analysis data stored in the first memory region, the storage device may search for the autonomous driving analysis data that has reached the expiration of the storage duration according to the first parameter 310.

The storage device may delete the autonomous driving analysis data found in operation S500, based on the policy register 300 (e.g., based on the "set" policy for managing autonomous driving analysis data to which the policy register is "set"), in operation S510. In some example embodiments, the storage device may delete the found autonomous driving analysis data, based on the data deletion unit according to the second parameter 320 and the data deletion method according to the third parameter 330.

Figure 9A:
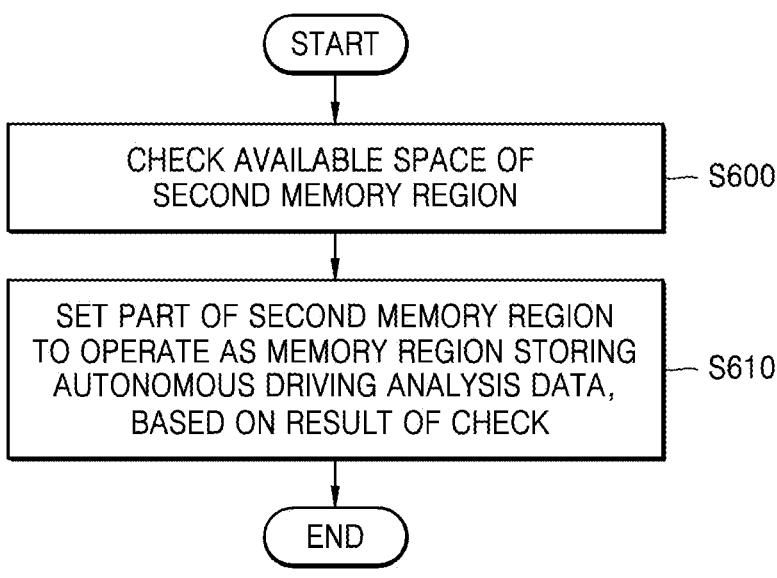
FIG. 9A is a flowchart of an operating method of a storage device according to some example embodiments.
Figure 9B:
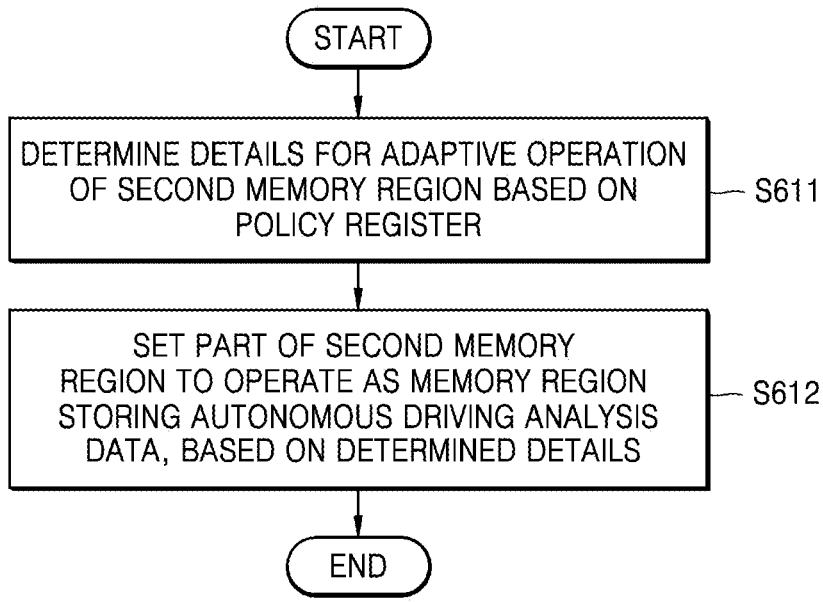
FIG. 9B is a detailed flowchart according to some example embodiments.

FIG. 9A is a flowchart of an operating method of a storage device, according to some example embodiments, and FIG. 9B is a detailed flowchart of operation S610 in FIG. 9A according to some example embodiments. The operating methods shown in FIGS. 9A and 9B may be implemented by any of the example embodiments of a storage device, including the storage device 220 shown in FIG. 2, the storage device 220 shown in FIG. 3, the storage device 120 shown in FIG. 1, or the like.

Referring to FIG. 9A, the storage device may check an available space of a second memory region, which is operated to store general data, in operation S600. In some example embodiments, the storage device may monitor a plurality of pieces of target information related to autonomous driving, predict a shortage of a first memory region storing autonomous driving analysis data, and check the available space of the second memory region first to increase a free space of the first memory region.

The storage device may set a part of the second memory region to operate as a memory region storing autonomous driving analysis data (e.g., to effectively operate as a part of the first memory region to which autonomous driving analysis data is stored), based on a result of the check in operation S600, in operation S610. In some example embodiments, the storage device may set a part of the available space (e.g., memory cells at which data is not presently being stored) of the second memory region to operate as the first memory region (e.g., as a part of the first memory region). In some example embodiments, the storage device may predict the amount of insufficient capacity of the first memory region (e.g., determine a storage capacity, represented by a quantity of memory cells, representing a difference between the memory cells of the free space of the first memory region and the amount of storage capacity represented thereby and a predicted future amount of autonomous driving analysis data that is predicted to be received for storage in the first memory region in a particular future time period as the amount of insufficient capacity) and secure a capacity corresponding to the amount of insufficient capacity from the second memory region (e.g., set a corresponding quantity of memory cells of the second memory region, representing a storage capacity equal to or greater than the predicted amount of insufficient capacity). The storage device may predict whether the shortage of the first memory region is resolved and may recover the capacity secured from the second memory region when it is predicted (e.g., in response to a determination) that the shortage of the first memory region is resolved.

Referring further to FIG. 9B, the storage device may determine details for adaptive operation of the second memory region based on a policy register in operation S611. In some example embodiments, the details may include a capacity set to operate as the first memory region, a memory cell level (e.g., a single-level cell (SLC), a multiple-level cell (MLC), a triple-level cell (TLC), or a quadrature-level cell (QLC)) of a memory region set to operate as the first memory region, a recovery time, etc.

The storage device may set the part of the second memory region to operate as the memory region storing the autonomous driving analysis data, based on the details determined in operation S611, in operation S612.

Figure 10:
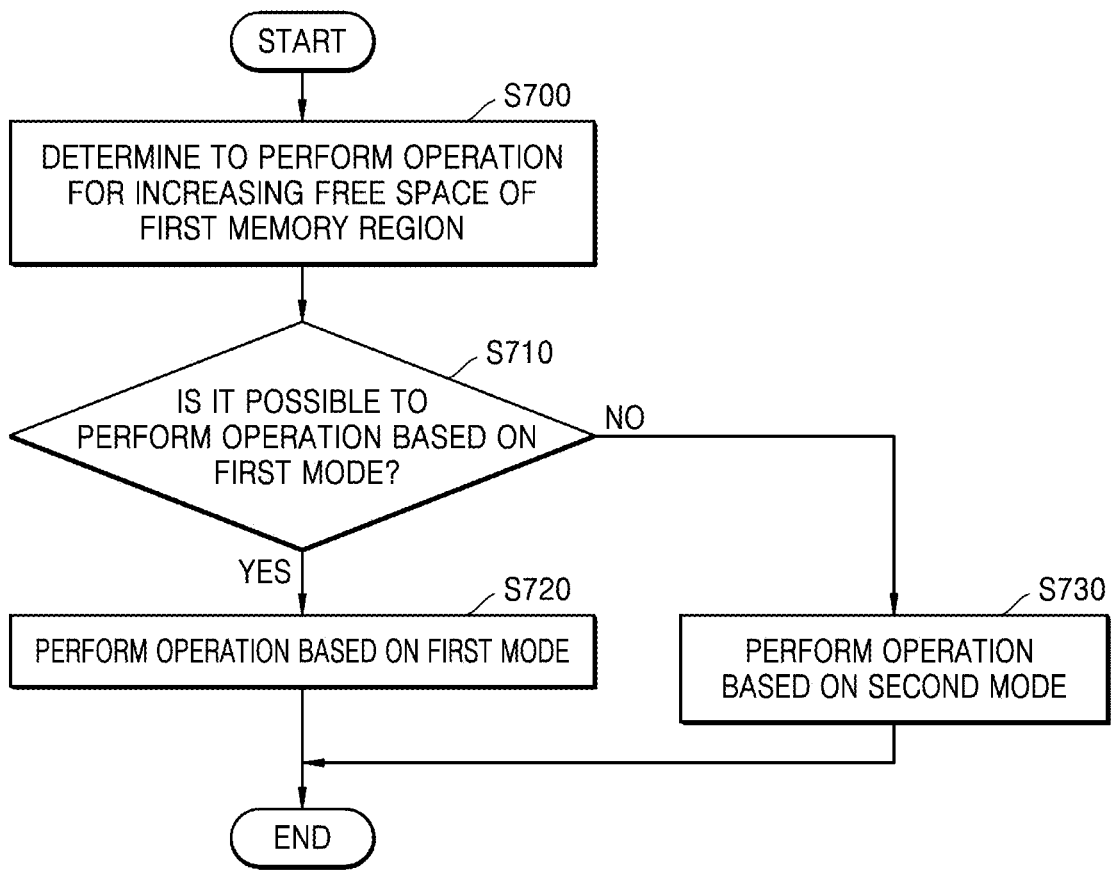
FIG. 10 is a flowchart of an operating method of a storage device, according to some example embodiments.

FIG. 10 is a flowchart of an operating method of a storage device, according to some example embodiments. The operating method shown in FIG. 10 may be implemented by any of the example embodiments of a storage device, including the storage device 220 shown in FIG. 2, the storage device 220 shown in FIG. 3, the storage device 120 shown in FIG. 1, or the like.

Referring to FIG. 10, the storage device may determine to perform an operation for increasing a free space of a first memory region in operation S700.

The storage device may determine whether it is possible to perform the operation based on a first mode in operation S710. In some example embodiments, the storage device may determine whether it is possible to perform the operation based on the first mode in a current state or whether it is possible to support the operation based on the first mode.

In the case of "YES" in operation S710, the storage device may perform the operation based on the first mode in operation S720.

In the case of "NO" in operation S710, the storage device may perform the operation based on a second mode in operation S730.

In some example embodiments, the first mode may include setting a part of a second memory region to operate as the first memory region and the second mode may include changing a policy, which is stored in the first memory region to manage autonomous driving analysis data. In some example embodiments, the first mode may include changing a policy, which is stored in the first memory region to manage autonomous driving analysis data, and the second mode may include setting a part of the second memory region to operate as the first memory region.

According to some example embodiments, the storage device may selectively use one of the first mode or the second mode for the operation to increase a free space of the first memory region.

Figure 11:
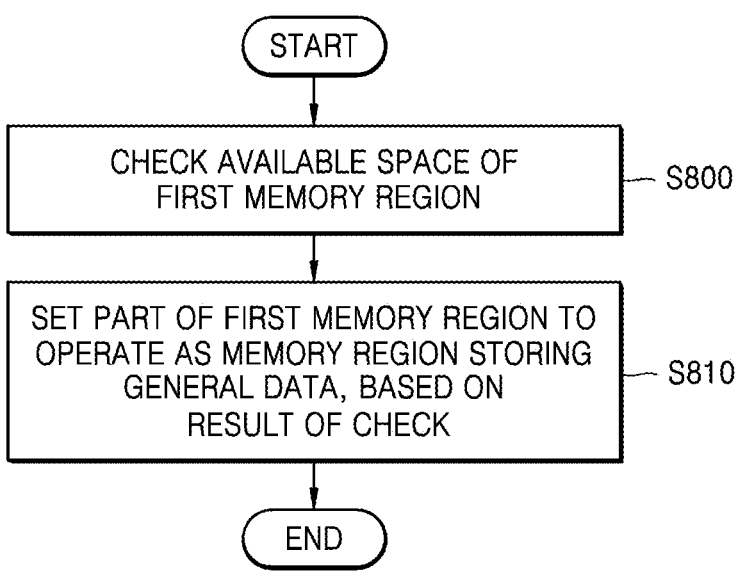
FIG. 11 is a flowchart of an operating method of a storage device, according to some example embodiments.

FIG. 11 is a flowchart of an operating method of a storage device, according to some example embodiments. The operating method shown in FIG. 11 may be implemented by any of the example embodiments of a storage device, including the storage device 220 shown in FIG. 2, the storage device 220 shown in FIG. 3, the storage device 120 shown in FIG. 1, or the like.

Referring to FIG. 11, the storage device may check an available space (e.g., free space) of a first memory region, which is operated to store autonomous driving analysis data, in operation S800. In some example embodiments, when there are insufficient free blocks (e.g., memory cells) for performing garbage collection or wear leveling on a second memory region, the storage device may first check the available space of the first memory region to use a free space of the first memory region.

The storage device may set a part of the first memory region to operate as a memory region storing general data, based on a result of the check in operation S800, in operation S810.

According to some example embodiments, the storage device may use the first memory region when the second memory region is insufficient.

Figure 12:
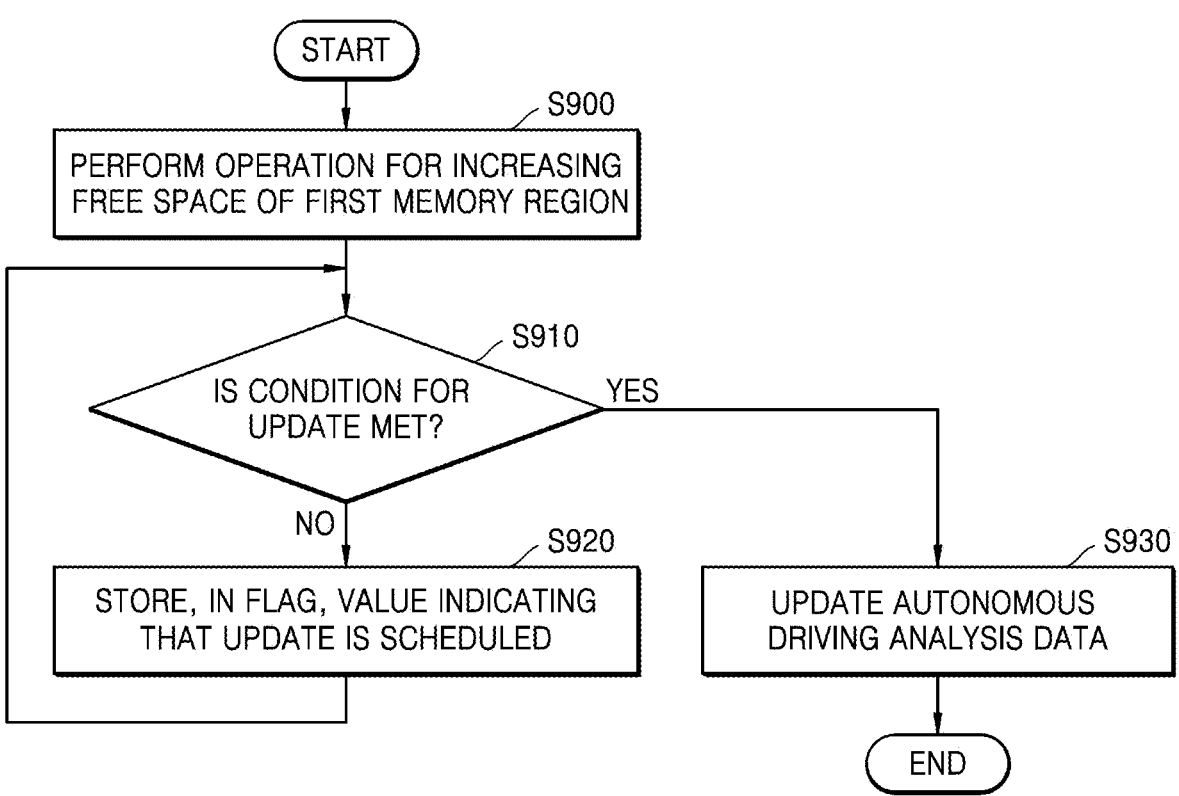
FIG. 12 is a flowchart of an operating method of a storage device, according to some example embodiments.

FIG. 12 is a flowchart of an operating method of a storage device, according to some example embodiments. The operating method shown in FIG. 12 may be implemented by any of the example embodiments of a storage device, including the storage device 220 shown in FIG. 2, the storage device 220 shown in FIG. 3, the storage device 120 shown in FIG. 1, or the like.

Referring to FIG. 12, the storage device may perform an operation for increasing a free space of a first memory region, which is operated to store autonomous driving analysis data, in operation S900.

The storage device may determine whether a current state meets a condition for update in operation S910. In some example embodiments, before updating the autonomous driving analysis data according to operation S900, the storage device may first check whether the current state of an autonomous vehicle meets the condition for update. Herein, the update of autonomous driving analysis data may include deletion or migration of the autonomous driving analysis data. In some example embodiments, the condition for update may include at least one of a state where an autonomous vehicle approaches or is located at a pre-designated place and a state where an autonomous vehicle is stopped or parked.

In the case of "NO" in operation S910, the storage device may store a value, which indicates that an update is scheduled, in a flag of autonomous driving analysis data to be updated in operation S920.

In the case of "YES" in operation S910, the storage device may update the autonomous driving analysis data in operation S930.

Figure 13:
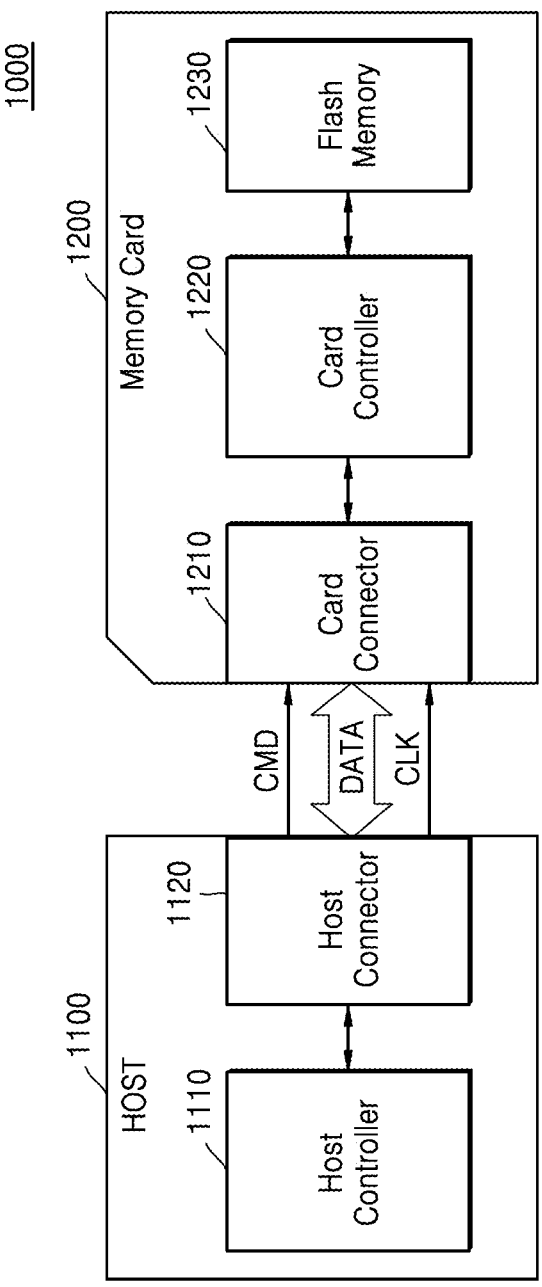
FIG. 13 is a block diagram of a memory card system according to some example embodiments.

FIG. 13 is a block diagram of a memory card system 1000 according to some example embodiments.

Referring to FIG. 13, the memory card system 1000 may include a host 1100 and a memory card 1200. The memory card 1200 may correspond to a storage device to which some example embodiments, including any of the example embodiments described with reference to FIGS. 1 to 12, are applied. The host 1100 may include a host controller 1110 and a host connector 1120. The memory card 1200 may include a card connector 1210, a card controller 1220, and flash memory 1230.

The host 1100 may write data to the memory card 1200 or read data from the memory card 1200. The host controller 1110 may transmit a request (e.g., a write request), a clock signal CLK generated by a clock generator of the host 1100, and data DAT to the memory card 1200 through the host connector 1120. In response to a write request received through the card connector 1210, the card controller 1220 may store data in the flash memory 1230 in synchronization with a clock signal generated by a clock generator of the card controller 1220. The flash memory 1230 may store data transmitted from the host 1100.

In some example embodiments, the flash memory 1230 may include a first memory region that is operated to store autonomous driving analysis data received from the host 1100. In some example embodiments, the card controller 1220 may monitor the received autonomous driving analysis data, predict a shortage of the first memory region, and perform an operation for increasing a free space of the first memory region.

Figure 14:
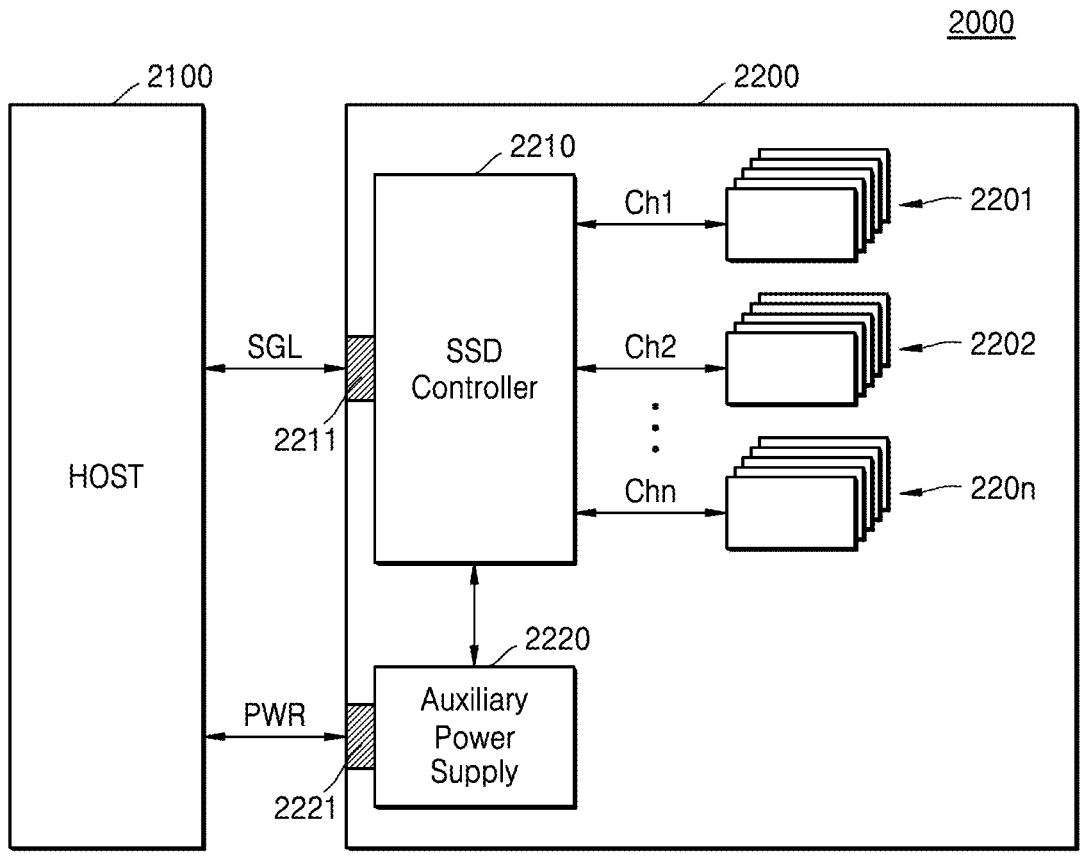
FIG. 14 is a block diagram of a solid-state drive (SSD) system according to some example embodiments.

FIG. 14 is a block diagram of a solid-state drive (SSD) system 2000 according to some example embodiments.

Referring to FIG. 14, the SSD system 2000 may include a host 2100 and an SSD 2200. The SSD 2200 may correspond to a storage device to which the embodiments described with reference to FIG. 1 and so on are applied.

The SSD 2200 may exchange signals SGL with the host 2100 through a signal connector 2211 and may receive power PWR through a power connector 2221. The SSD 2200 may include a plurality of flash memories 2201 to 220n ("n" being any positive integer), an SSD controller 2210, an auxiliary power supply 2220. The flash memories 2201 to 220n may be used as storage media of the SSD 2200. Apart from flash memory, the SSD 2200 may include non-volatile memory, such as PRAM, MRAM, RRAM, or FRAM.

The flash memories 2201 to 220n may be connected to the SSD controller 2210 through channels Ch1 to Chn, respectively. One or more flash memories may be connected to one channel. Flash memories connected to one channel may be connected to the same data bus. The SSD controller 2210 may exchange the signals SGL with the host 2100 through the signal connector 2211. Here, the signals SGL may include a request, an address, and data. The SSD controller 2210 may program data to flash memory or read data from the flash memory according to the request of the host 2100.

The auxiliary power supply 2220 may be connected to the host 2100 through the power connector 2221. The auxiliary power supply 2220 may receive the power PWR from the host 2100 and may be charged. The auxiliary power supply 2220 may be arranged inside or outside the SSD 2200. For example, the auxiliary power supply 2220 may be arranged in a main board and may provide auxiliary power to the SSD 2200.

In some example embodiments, the flash memories 2201 to 220n may each include a first memory region that is operated to store autonomous driving analysis data received from the host 2100. In some example embodiments, the SSD controller 2210 may monitor the received autonomous driving analysis data, predict a shortage of the first memory region, and perform an operation for increasing a free space of the first memory region.

As described herein, any devices, systems, modules, portions, units, controllers, circuits, and/or portions thereof according to any of the example embodiments, and/or any portions thereof (including, without limitation, the autonomous driving system 1, the autonomous driving server, the network 3, the autonomous vehicle 10, the zonal control system 100, the host device 110, the ZCU 111, the storage device 120, the management circuit 121, the autonomous vehicle 20, the 1st to 3rd ZCUs 211, 212, and 213, the storage device 220, the central computing system 230, the 1st to 3rd sensors 241A, 242A, and 243A, the 1st to 3rd actuators 241B, 242B, and 243B, any portion thereof, the controller 221, the management circuit 222, the memory device 223, the first memory region 223A, the second memory region 223B, the buffer memory 224, the policy register 300, the memory card system 1000, the host 1100, the host controller 1110, the host connector 1120, the memory card 1200, the card connector 1210, the card controller 1220, the flash memory 1230, the SSD system 2000, the host 2100, the SSD 2200, the SSD controller 2210, the SSD connector 2211, the plurality of flash memories 2201 to 220n, the auxiliary power supply 2220, the power connector 2221, any portion thereof, or the like) may include, may be included in, and/or may be implemented by one or more instances of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid state drive (SSD), storing a program of instructions, and a processor (e.g., CPU) configured to execute the program of instructions to implement the functionality and/ or methods performed by some or all of any devices, systems, modules, portions, units, controllers, circuits, and/ or portions thereof according to any of the example embodiments.

While the inventive concepts have been particularly shown and described with reference to some example embodiments thereof, it will be understood that various changes in form and details may be made therein without departing from the spirit and scope of the following claims.

What is claimed is:

1. A storage device, comprising:
a memory device including a first memory region configured to store autonomous driving analysis data;
a policy register configured to be set to a first policy by a host as a set policy for managing the autonomous driving analysis data; and
a controller configured to control a memory operation of the memory device,
wherein the controller includes a management circuit configured to:
monitor a plurality of pieces of target information related to autonomous driving,
predict a shortage of the first memory region, and
perform an operation to increase a free space of the storage device based on a result of the prediction,
wherein the operation to increase the free space comprises transmitting, by the management circuit, a policy change request to the host, the policy change request requesting to change the first policy into a second policy,
wherein the policy register stores a first parameter indicating a storage duration of the autonomous driving analysis data, and a second parameter indicating a unit in which the autonomous driving analysis data is deleted, and
wherein the policy change request is configured to cause modification of at least one of the first parameter or the second parameter to increase the free space.

2. The storage device of claim 1, wherein
the plurality of pieces of target information include at least one of
driver setting information, driver characteristic information, remaining space information of the first memory region, or autonomous driving analysis data reception information.

3. The storage device of claim 1, wherein
the policy register stores a third parameter related to a data deletion method associated with the autonomous driving analysis data, and
wherein the policy change request is configured to cause modification of the third parameter.

4. The storage device of claim 1, wherein
the management circuit is further configured to:
search among the autonomous driving analysis data to find autonomous driving analysis data to be deleted based on the policy register, and
delete the found autonomous driving analysis data from the first memory region based on the policy register.

5. The storage device of claim 1, wherein the second policy corresponds to a policy indicated by the management circuit.

6. The storage device of claim 5, wherein the policy change request includes information indicating the second policy.

7. The storage device of claim 1, wherein the second policy corresponds to a policy determined by the host.

8. The storage device of claim 1, wherein
the memory device further includes a second memory region configured to store general data, and
the operation to increase the free space of the storage device includes
an operation of setting, by the management circuit, a part of the second memory region to operate as a memory region storing the autonomous driving analysis data.

9. The storage device of claim 8,
wherein the operation to increase the free space of the storage device further includes determining, by the management circuit, parameters for adaptive operation of the second memory region based on the policy register, and
wherein setting the part of the second memory region to operate as the memory region storing the autonomous driving analysis data is based on the determined parameters for adaptive operation of the second memory region based on the policy register.

10. The storage device of claim 1, wherein:
the memory device further includes a second memory region configured to store general data, and
the management circuit is further configured to
set a part of the first memory region to operate as a memory region storing the general data in response to a determination that the second memory region is insufficient.

11. The storage device of claim 1, wherein the management circuit is further configured to, in response to a determination that a state of a vehicle equipped with the storage device does not meet an update condition,
store a flag value indicating that an update of the autonomous driving analysis data stored in the first memory region is scheduled.

12. The storage device of claim 1, wherein
the autonomous driving analysis data includes at least one selected from the group consisting of
data associated with accident records of an autonomous vehicle, data associated with evaluating safety performance of the autonomous vehicle, and data associated with safety monitoring of the autonomous vehicle.

13. The storage device of claim 1, wherein
the management circuit is further configured to apply different weights to the plurality of pieces of target information before monitoring the plurality of pieces of target information.

14. An operating method of a storage device of an autonomous vehicle, wherein the storage device is communicatively connected to a host device including a plurality of zonal control units (ZCUs), the operating method comprising:
storing first autonomous driving analysis data received from the host device in a first memory region of the storage device;
monitoring a plurality of pieces of target information related to autonomous driving and predicting a shortage of the first memory region; and
performing an operation to increase a free space of the storage device, wherein the performing of the operation for increasing the free space of the storage device includes setting a part of a second memory region of the storage device, the second memory region storing general data, to operate as a memory region storing second autonomous driving analysis data to be received from the host device.

15. The operating method of claim 14, wherein the plurality of pieces of target information include information associated with an autonomous driving level set by a driver, information associated with the driver's autonomous driving use time, information associated with the driver's habits, and information associated with a remaining space of the first memory region.

16. The operating method of claim 14, wherein the performing of the operation for increasing the free space of the first memory region includes transmitting a policy change request to the host device, the policy change request requesting to change a policy for managing autonomous driving analysis data including the first autonomous driving analysis data.

17. The operating method of claim 16, wherein the policy includes a storage duration of the autonomous driving analysis data, a data deletion unit for the autonomous driving analysis data, and a data deletion method for the autonomous driving analysis data.

18. A storage device comprising:

a memory device including a first memory region and a second memory region, the first memory region configured to store autonomous driving analysis data received from a host, the second memory region configured to store general data; and a controller configured to manage first autonomous driving analysis data stored in the first memory region, based on a policy initially set by the host, wherein the controller is further configured to monitor second autonomous driving analysis data received from the host, predict a shortage of the first memory region, and selectively perform one of an operation of, based on a result of the prediction, requesting the host to change at least one of a storage duration of the autonomous driving analysis data or a unit in which the autonomous driving analysis data is deleted, or an operation of setting a part of the second memory region to operate as a memory region storing third autonomous driving analysis data to be received from the host.

* * * * *